United States Patent
Bolivar et al.

(10) Patent No.: US 10,289,736 B2
(45) Date of Patent: May 14, 2019

(54) SYSTEMS AND METHODS FOR RANKING RESULTS BASED ON DWELL TIME

(75) Inventors: Alvaro Bolivar, San Francisco, CA (US); Wenyan Hu, Shanghai (CN)

(73) Assignee: eBay Inc., San Jose, CA (US)

(*) Notice: Subject to any disclaimer, the term of this patent is extended or adjusted under 35 U.S.C. 154(b) by 1703 days.

(21) Appl. No.: 12/814,020

(22) Filed: Jun. 11, 2010

(65) Prior Publication Data

US 2011/0307411 A1 Dec. 15, 2011

(51) Int. Cl.
*G06F 17/30* (2006.01)
*G06Q 30/02* (2012.01)

(52) U.S. Cl.
CPC ... *G06F 17/30867* (2013.01); *G06Q 30/0282* (2013.01)

(58) Field of Classification Search
CPC .................................................. G06F 17/30867
USPC ....................................................... 705/14.41
See application file for complete search history.

(56) References Cited

U.S. PATENT DOCUMENTS

| | | | |
|---|---|---|---|
| 2006/0036400 A1* | 2/2006 | Kasriel et al. | 702/182 |
| 2006/0064411 A1* | 3/2006 | Gross et al. | 707/3 |
| 2009/0024463 A1* | 1/2009 | Szeto | 705/14 |
| 2009/0327184 A1* | 12/2009 | Nishizaki et al. | 706/46 |
| 2010/0169343 A1* | 7/2010 | Kenedy et al. | 707/758 |
| 2011/0029509 A1* | 2/2011 | Kumthekar et al. | 707/723 |
| 2011/0054999 A1* | 3/2011 | Attenberg et al. | 705/14.43 |
| 2011/0060652 A1* | 3/2011 | Morton | 705/14.58 |

OTHER PUBLICATIONS

Agichtein, Eugene, et al., "Improving Web Search Ranking by Incorporating User Behavior Information", SIGIR, ACM 1-59593-369-7/06/0008, (Aug. 6), 8 pgs.

Dupret, Georges, et al., "A Model to Estimate Intrinsic Document Relevance for the Clickthrough Logs of a Web Search Engine", WSDM, [Online]. Retrieved from the Internet: <URL: http://wume.cse.lehigh.edu/—ovd209/wsdm/proceedings/docs/p181.pdf>, (2010), 181-190.

Imhof, Julia, "Web Search Enhancement based on User Behavior Information", [Online]. Retrieved from the Internet: <URL: http://www.dbis.ethz.ch/education/ss2007/07_dbs_algodbs/ImhofSlides.pdf>, (Sep. 6, 2007), 24 pgs.

Piwowarski, Bengamin, et al., "Mining User Web Search Activity with Layered Bayesian Networks or How to Capture a Click in its Context", WSDM, [Online]. Retrieved the Internet: <URL: http://citeseerx.ist.psu.edu/viewdoc/download?doi=10.1.1.150.1419&rep=rep1&type=pdf>, (2009), 10 pgs.

* cited by examiner

*Primary Examiner* — Daniel M Sorkowtiz
(74) *Attorney, Agent, or Firm* — Shook, Hardy & Bacon L.L.P.

(57) ABSTRACT

A method and a system to rank search results based on dwell time is provided. The system comprises a search module to identify a plurality of listings stored in a listing database as search results. A dwell time module determines a respective dwell time associated with each of the plurality of listings. The dwell time is based on an elapsed amount of time one or more buyers view a view item page associated with the listing. A ranking module ranks the listings composing the identified plurality of listings based at least in part on the respective dwell time associated with each of the plurality of listings.

19 Claims, 6 Drawing Sheets

SYSTEMS AND METHODS FOR RANKING RESULTS BASED ON DWELL TIME

TECHNICAL FIELD

The present disclosure generally relates to data processing techniques. More specifically, the present disclosure relates to methods and systems for managing how search results are ranked and presented to a user of a computer-based trading or e-commerce application.

BACKGROUND

Advancements in computer and networking technologies have enabled persons to conduct commercial and financial transactions "on-line" via computer-based applications. This has given rise to a new era of electronic commerce (often referred to as e-commerce.) A number of well-known retailers have expanded their presence and reach by operating websites that facilitate e-commerce. In addition, many new retailers, which operate exclusively online, have come into existence. The business models utilized by enterprises operating online are almost as varied as the products and services offered. For instance, some products and services are offered at fixed prices, while others are offered via various auction methods, and still others are offered via a system of classified ad listings. Some enterprises specialize in the selling of a specific type of product (e.g., books) or a specific service (e.g., tax preparation), while others provide a myriad of categories of items and services from which to choose. Some enterprises serve only as an intermediary, connecting sellers and buyers, while others sell directly to consumers.

Despite the many technical advances that have improved the state of e-commerce, a great number of technical challenges and problems remain. One such problem involves determining how to best present products and services (e.g., items) that are being offered for sale, so as to maximize the likelihood that a transaction (e.g., the sale of a product or service) will occur. For instance, when a potential buyer performs a search for a product or service, it may often be the case that the number of item listings that satisfy the potential buyer's query far exceeds the number of item listings that can practically be presented on a search results page. Furthermore, it is well established that the presentation of an item listing in a search results page—for example, the order or placement of the item listing in a list of listings, the font, font size, or color of the listing, and so on—can affect whether potential buyers select the listing, and ultimately purchase the listed product or service.

For enterprises that serve as an intermediary—for example, by connecting buyers with sellers—it is generally desirable that the presentation of item listings occur in a fair manner that strikes a balance between the needs and desires of the various sellers, the buyers or potential buyers, and the enterprise itself. If a preference is given to one seller, such that the one seller's item listings are consistently being presented in the most prominent position(s) on a search results page, other sellers may not participate, which will ultimately have a negative impact on the enterprise. Similarly, if item listings are presented in accordance with an algorithm that is too rigid and that cannot easily be altered or tweaked, such as a first-listed first-presented algorithm, some sellers may attempt to game the system, again negatively impacting other sellers, the potential buyers' experience, and ultimately the enterprise itself. Furthermore, using a simple and rigid algorithm for presenting item listings prevents the enterprise from optimizing the presentation of item listings to improve the overall conversion rate for item listings. This may lead potential buyers to shop elsewhere, which ultimately will negatively affect the e-commerce enterprise.

BRIEF DESCRIPTION OF THE DRAWINGS

Some embodiments are illustrated by way of example and not limitation in the figures of the accompanying drawings in which.

DETAILED DESCRIPTION

Example methods and systems to rank search results based on dwell time are described. In the following description, for purposes of explanation, numerous specific details are set forth in order to provide a thorough understanding of example embodiments. It will be evident, however, to one skilled in the art that the present invention may be practiced without these specific details.

Figure 1:
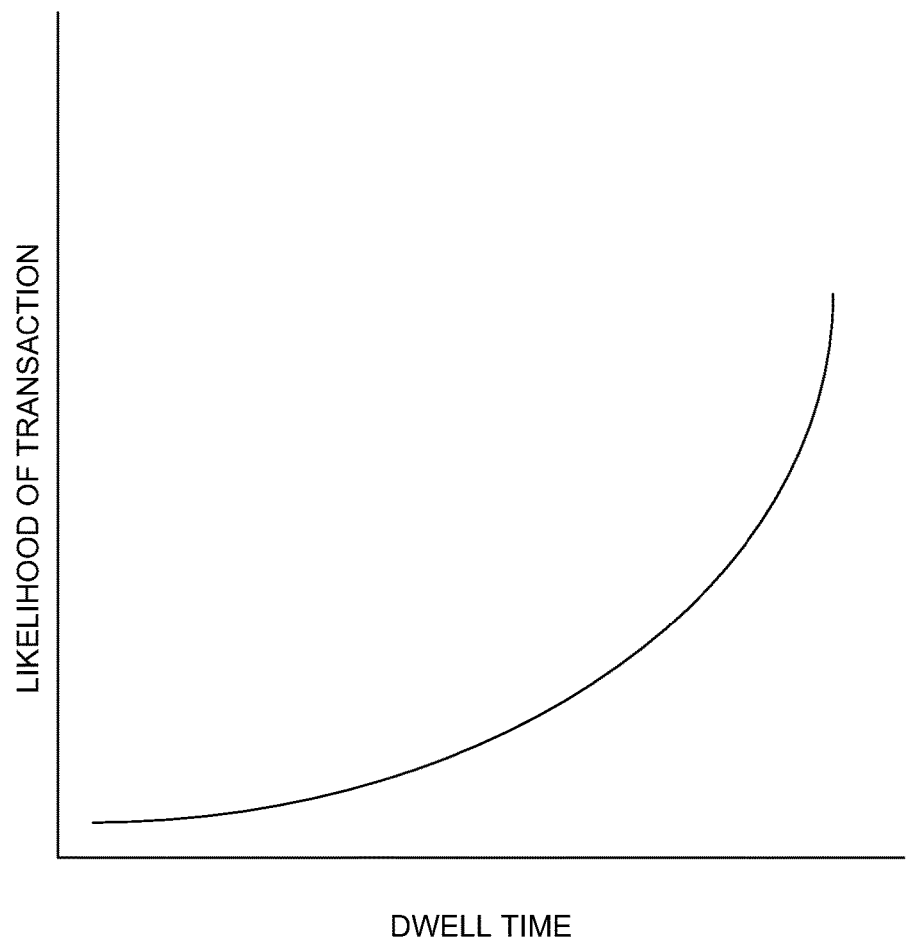
FIG. 1 is a graph of a likelihood of a transaction occurring based on dwell time.

FIG. 1 is a graph of a likelihood of a transaction occurring based on dwell time at a "view item" page. A view item page is a webpage used to present information about a listing and to describe an item for sale by virtue of the listing. The likelihood of a transaction concluding is a likelihood that a potential buyer, using the e-commerce application, will complete a transaction by, for example, purchasing an item or bidding in an auction for an item that is described in the view item page. In the context of the present disclosure, the dwell time is the amount of time that elapses beginning when a potential buyer navigates to a view item page from a display of search results and ending when the potential buyer navigates away from the view item page. As such, the dwell time represents the amount of time the potential buyer interacts with or views the view item page. Navigating from the view item page may include returning to the display of search results, closing a tab in a browser depicting the view item page, completing the transaction (e.g., navigating to a shopping cart or payment page), or navigating to another view item page. The dwell time may include elapsed time where the potential buyer has navigated to a page displaying feedback about the seller of the item. In contrast to other elapsed time algorithms, the dwell time used herein is a measure of the amount of time that the user remains on the view item page instead of an amount of time elapsed since the user last visited a "search results" page.

In general, historical analysis has shown that the more time that has elapsed with the potential buyer viewing the view item page (i.e., as the dwell time increases), the more likely the potential buyer will complete a transaction. To illustrate, a potential buyer interested in buying an item will likely spend extra time reviewing the view item page, looking at images of the item, and reading feedback about the seller. If a relatively shorter amount of time has elapsed, the item described by the listing may not be particularly relevant to the potential buyer or may be a "bad" listing. If the item is not particularly relevant, the listing may be mis-categorized or otherwise incorrectly associated with one or more of the search terms. A listing may be a "bad" listing if the listing is unattractive to potential buyers for a number of reasons. For example, a listing may be unattractive if it is incomplete, misleading, or otherwise undesirable.

The systems and methods described herein provide a way to rank search results based on a history of the amount of dwell time for a particular view item page. In various embodiments, a dwell time is calculated for each listing that is used to rank the listings within a set of search results. As the dwell time of a user at a particular listing increases, the likelihood that the potential buyer will enter into a transaction for the particular good also increases. Similarly, if a potential buyer spends only a short amount of time viewing the listing, the likelihood that the buyer will enter into a transaction is lower.

Other functions may be used to determine a dwell time. For example, after a longer amount of dwell time has passed, the transaction likelihood associated with a listing may reach a peak and start to decrease. Additionally, various types of dwell time may be measured. For example, a first dwell time may be an overall dwell time for the listing and a second dwell time may be based on a subset of user interactions that are characterized by a success event where a success event is a purchase, bid, adding the listing to a watch list or sharing the listing with friends.

Figure 2:
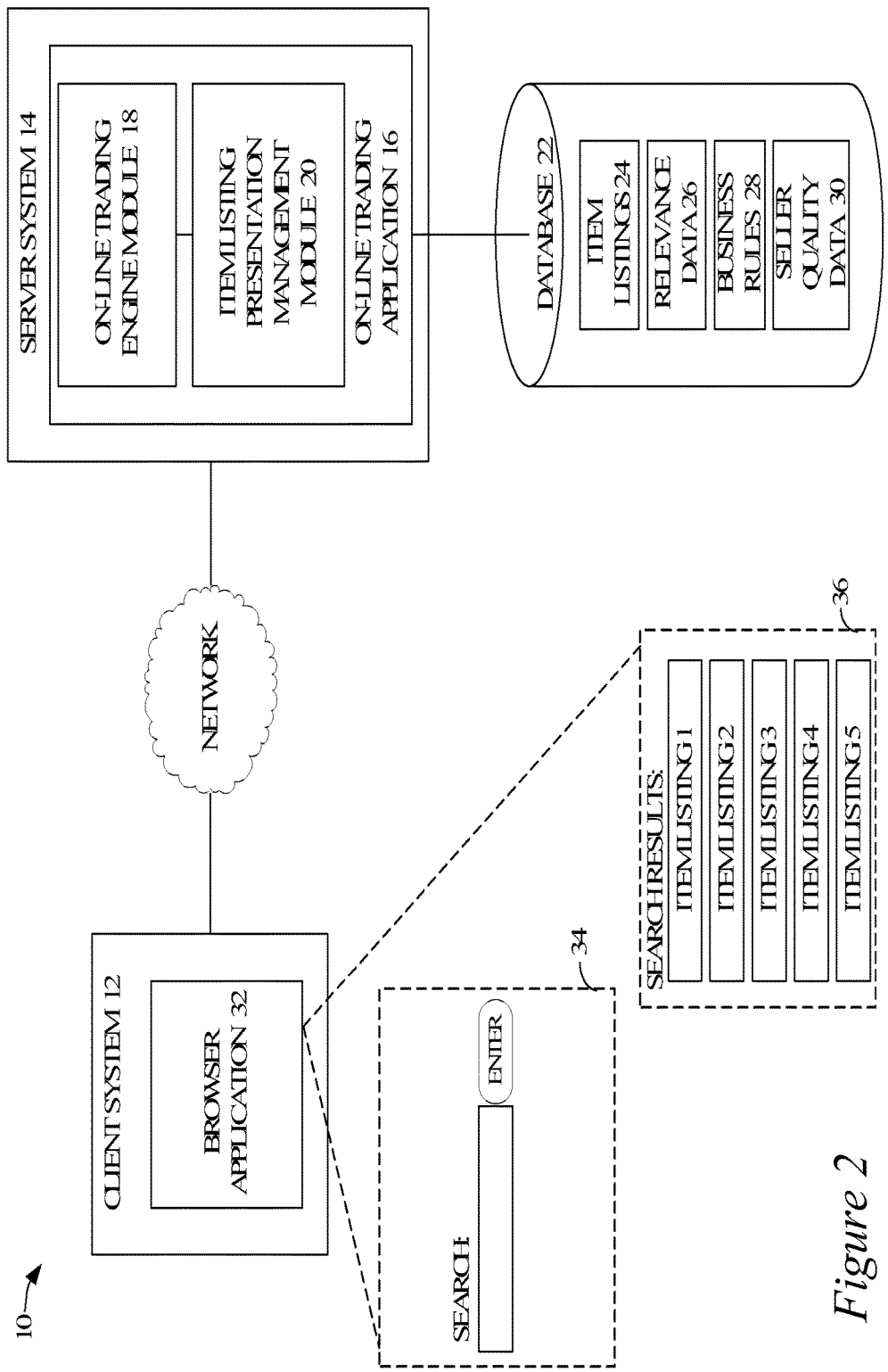
FIG. 2 is a block diagram of a network environment including a network-connected client system and server system, with which an embodiment of the invention might be implemented.

FIG. 2 is a block diagram of a network environment 10 including a network-connected client system 12 and server system 14, with which an embodiment of the invention might be implemented. As illustrated in FIG. 2, the server system 14 is shown to include an on-line trading application 16. In this example, the online trading application 16 is comprised of two primary modules—an on-line trading engine module 18, and an item listing presentation management module 20.

In some embodiments, the on-line trading engine module 18 may consist of a variety of sub-components or modules, which provide some of the functions of an on-line trading application 16. As described more completely below, each module may be comprised of software instructions, computer hardware components, or a combination of both. To avoid obscuring the invention in unnecessary detail, only a few of the on-line trading engine functions (germane to the invention) are described herein. For example, the on-line trading engine module 18 may include an item listing management module (not shown) that facilitates the receiving and storing of data representing item attributes, which collectively form a listing or view item page. When a user desires to list a single item, or multiple items, for sale, the user will provide information about the item(s) (e.g., item attributes). Such information may be submitted via one or more forms of one or more web pages, or via drop down lists, or similar user interface elements. The item listing management module receives the item attributes and stores the item attributes together within a database 22 as an item listing 24. In some instances, the item listings may be stored in an item listing database table. The item attributes of each item listing may analyzed to determine a ranking score assigned to item listings and used in determining the position of item listings when the item listings are being presented in a search results page.

The on-line trading engine module 18 may also include one or more modules for receiving and storing historical data that is used to measure the likelihood that an item listing will, if presented in a search results page, result in a transaction being concluded. For instance, in some embodiments, data associated with user-initiated activities are analyzed and captured for the purpose of predicting future user activities. If a user submits a search request including certain search terms, and then proceeds to conclude a transaction for a particular item (e.g., purchase the item), information from the user's interaction with the online trading application will be captured and stored for the purpose of predicting future actions by other users. Some of the data used in this capacity is generally referred to as relevance data 26 because it is used to determine a measure of relevance between search terms used in a search query, and individual item listings. For instance, if a potential buyer submits a search request with the search terms, "mobile phone", item listings that have certain item attributes are more likely to result in the conclusion of a transaction if presented in a search results page in response to the search request. For instance, continuing with the example search terms, "mobile phone", given the specific search terms used in the search query, item listings that have been designated as being in a certain category of items, such as "Electronics", or even more specifically, "Mobile Phones", are more likely to result in a transaction if presented in a search results page than item listings in other categories, for example, such as "Automobiles" or "Jewelry". Similarly, given the search terms, "mobile phone", item listings with titles that include the search terms may prove more likely to result in a transaction than item listings without the search terms in the title. Accordingly, in some embodiments, the on-line trading engine 18 includes one or more modules for receiving and analyzing historical data to generate what is referred to herein as relevance data. The relevance data is used to derive a measure of the likelihood that item listings with certain item attributes will result in a transaction if displayed in response to certain search terms being submitted in a search request.

The on-line trading engine module 18 may also include one or more modules for receiving and storing data representing, among other things, a measure of a seller's performance of obligations associated with transactions in which the seller has participated. For instance, in some embodiments, when a transaction is concluded, a buyer may be prompted to provide feedback information concerning the performance of a seller. The buyer may, for example, rate the accuracy of the seller's description of an item provided in the item listing. For instance, if the item received by the buyer is in poor condition, but was described in the item listing as being in good condition, the buyer may provide feedback information to reflect that the seller's description of the item in the item listing was inaccurate. As described more fully below, this information may be used in a variety of ways to derive a ranking score for an item listing. For instance, in some cases, the seller feedback information may be used to determine a ranking score for another item listing of the same seller. Such information may be stored in a database 22, as indicated in FIG. 1 by the seller quality data with reference number 30.

As illustrated in FIG. 2, the database is also shown to include business rules data 28. The business rules data 28 is managed and used by a business rules management module for the purpose of promoting and/or demoting item listings that satisfy a search query. For instance, when determining the order or arrangement of item listings for presentation on a search results page, an item listing may be promoted—presented in a more prominent position—or, demoted—presented in a less prominent position—based on the evaluation of a business rule that is dependent upon certain business rule data 28. In some embodiments, item attributes and seller attributes may be used in conjunction with business rule data 28, for the purpose of evaluating business rules. In some embodiments, the promotion or demotion may be effected by multiplying a business rules score and the ranking score. Business rules may be used to promote certain business policies and to impact user's behavior. For instance, a business rule that provides a promotion to item listings that are offering free shipping will likely have the effect of persuading sellers to offer free shipping to have their item listings appear in the most prominent positions of the search results page. Similarly, demoting item listings based on negative seller feedback information will typically motivate sellers to perform their obligations as agreed upon.

Referring again to FIG. 2, the second primary module of the on-line trading application 16 is an item listing presentation management module 20. The item listing presentation management module 20 provides the logic used to assign a ranking score (sometimes referred to as a Best Match Score) to item listings that satisfy a search query, and to use the ranking score to determine the order of item listings when the item listings are presented in a search results page.

For instance, in some embodiments, a user operates a web browser application 32 on a client system 12 to interact with the on-line trading application 16 residing and executing on the server system 14. As illustrated by the example user interface with reference number 34, a user may be presented with a search interface 34, with which the user can specify one or more search terms to be used in a search request submitted to the on-line trading application 16. In some embodiments, in addition to specifying search terms, users may be able to select certain item attributes, such as the desired color of an item, the item categories that are to be searched, and so on. After receiving and processing the search request, the on-line trading application 16 communicates a response to the web browser application 32 on the client system 12. For instance, the response is an Internet document or web page that, when rendered by the browser application 32, displays a search results page 36 showing several item listings that satisfy the user's search request. As illustrated in the example search results page 36 of FIG. 1, the item listings are arranged or positioned on the search results page in an order determined by the item listing presentation management module 20. The item listings are, in some embodiments, presented by a presentation module, which may be a web server or an application server.

In general, the item listings are presented in the search results page in an order based on a ranking score that is assigned to each item listing that satisfies the query. In some embodiments, the item listings will be arranged in a simple list, with the item listing having the highest ranking score appearing at the top of the list, followed by the item listing with the next highest ranking score, and so on. In some embodiments, several search results pages may be required to present all item listings that satisfy the query. Accordingly, only a subset of the set of item listings that satisfy the query may be presented in the first page of the search results pages. In some embodiments, the item listings may be ordered or arranged in some other manner, based on their ranking scores. For instance, instead of using a simple list, in some embodiments the item listings may be presented one item listing per page, or, arranged in some manner other than a top-down list.

As described in greater detail below, the ranking score is based, at least in part, on a dwell time associated with a listing. The ranking score may be additionally or partially based on several component scores including, but by no means limited to: a relevance score, representing a measure of the relevance of an item listing with respect to search terms provided in the search request; a listing quality score, representing a measure of the likelihood that an item listing will result in a transaction based at least in part on historical data associated with similar item listings and a dwell time associated with the listing; and, a business rules score, representing a promotion or demotion factor determined based on the evaluation of one or more business rules. As used herein, a component score is a score that is used in deriving the overall ranking score for an item listing. However, a component score in one embodiment may be a ranking score in another embodiment. For instance, in some embodiments, the ranking score may be equivalent to a single component score, such as the listing quality score. Similarly, in some embodiments, the ranking score may be equivalent to the business rules score.

Figure 3:
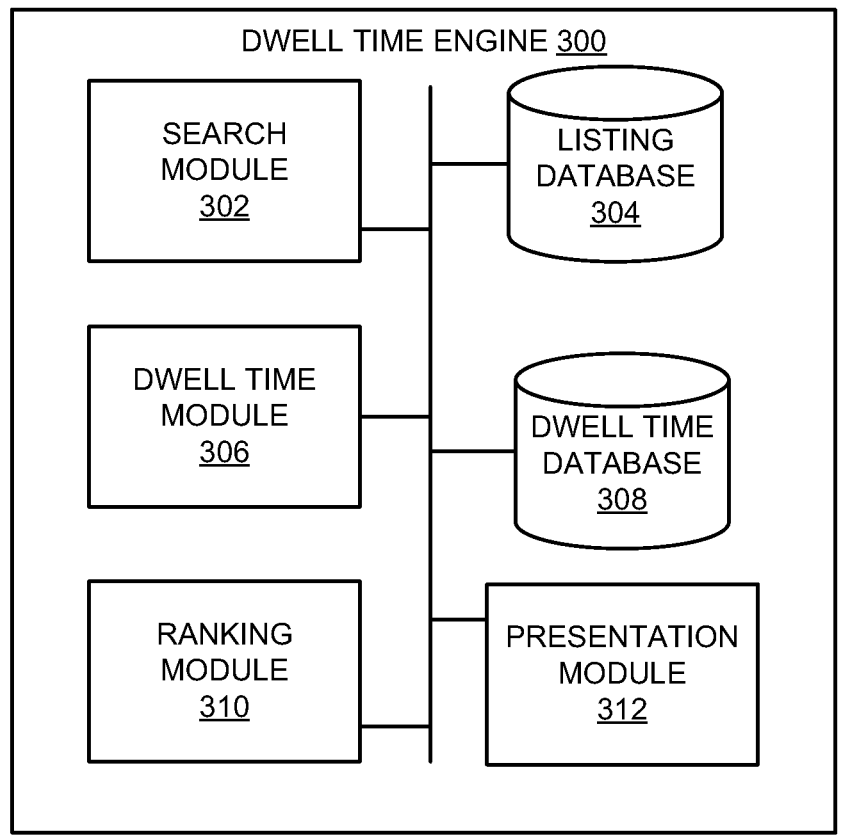
FIG. 3 is a block diagram of the various functional components or modules comprising a dwell time engine, according to an embodiment of the invention.

FIG. 3 is a block diagram of the various functional components or modules comprising a dwell time engine 300, according to an embodiment of the invention. The dwell time engine 300 may be in electronic communication with the item listing presentation management module 20 to assign a ranking score to item listings that satisfy a search query, and to use the ranking score to determine the order of item listings when the item listings are presented in a search results page. In some instances, the dwell time engine 300 is included in the item listing presentation management module 20 while in other instances, the dwell time engine 300 is maintained separately from the item listing presentation management module 20 or even separately from the online trading application 16.

A search module 302 is to receive a search query from a potential buyer and to identify one or more listings that correspond to the terms in the search query. The search module 302 may have access to a listings database 304 such as the item listings 24 in the database 22 of FIG. 2.

A dwell time module 306 is to determine a dwell time associated with each of the listings in the listings database 304. The dwell time is a metric of the amount of time a potential buyer has spent viewing a view item page describing an item for sale, as described in connection with FIG. 1. In some instances, the dwell time is determined once the number of views of the view item page exceeds a predetermined threshold (e.g., 10 views, 100 views, or 1000 views). The predetermined threshold may vary across categories of listings. The dwell time may represent the aggregate of all users' dwell time for the particular item listing or the dwell time may represent an average or a median dwell time per individual user.

The dwell time of a particular listing may be determined based on several factors, including, but not limited to, characteristics of the particular potential buyers at the view item page, behavior of the potential buyer at the view item page, the amount of information included in the view item page, and the type of transaction (e.g., a fixed price sale or an auction). Characteristics of the particular potential buyers may include a number of transactions completed over a period of time, whether the potential buyer has previously completed a transaction with the seller, and a history of dwell times (of the potential buyer) at other view item pages.

For example, if the particular potential buyer has completed a high number of transactions or if the buyer has previously completed a transaction with the seller, the particular potential buyer may be expected to have a shorter dwell time before completion of a transaction. The actual dwell time of the particular potential buyer at the view item page may be scaled up in these instances.

To determine a dwell time of the listing, the dwell time module 306 may access the measured dwell times of one or more potential buyers from a dwell time database 308. In some instances, a portion of the dwell times may be scaled based on information provided above. A portion of the measured dwell times may be removed or capped, if, for example, they exceed a predetermined threshold (e.g., four hours) where it may be assumed that the potential buyer is no longer viewing the listing but has not yet navigated away from the listing.

The dwell time database 308 may store a record of dwell times corresponding to the respective listings in the listing database 304. The record of a particular dwell time may be an actual dwell time, a scaled dwell time, or a stored dwell time.

Once the accessed dwell times (including actual dwell times, capped dwell times, and/or scaled dwell times) are retrieved, the dwell time module 306 may determine a dwell time to associate with the listing. The associated dwell time may be an average dwell time of the retrieved dwell times, a median dwell time of the retrieved dwell times, a mode of the retrieved dwell times, or some other aggregation of the retrieved dwell times.

The ranking module 310 ranks the listings based on the associated dwell time of the listings. The ranking may be performed on a set of listings identified via a search initiated by a user. The listings having a higher dwell time are ranked higher while the listings having a lower dwell time are ranked lower. The ranking module 310 may rank the listings based on additional factors. For example, additional factors may include relevance data 26, listing quality scores, and business rules 28, and seller quality data 30 as described in connection with FIGS. 2 and 5.

The presentation module 312, in connection with the item listing presentation management module 20, presents the ranked listings to a user. The ranked listings may be presented as a list or in another format.

Figure 4:
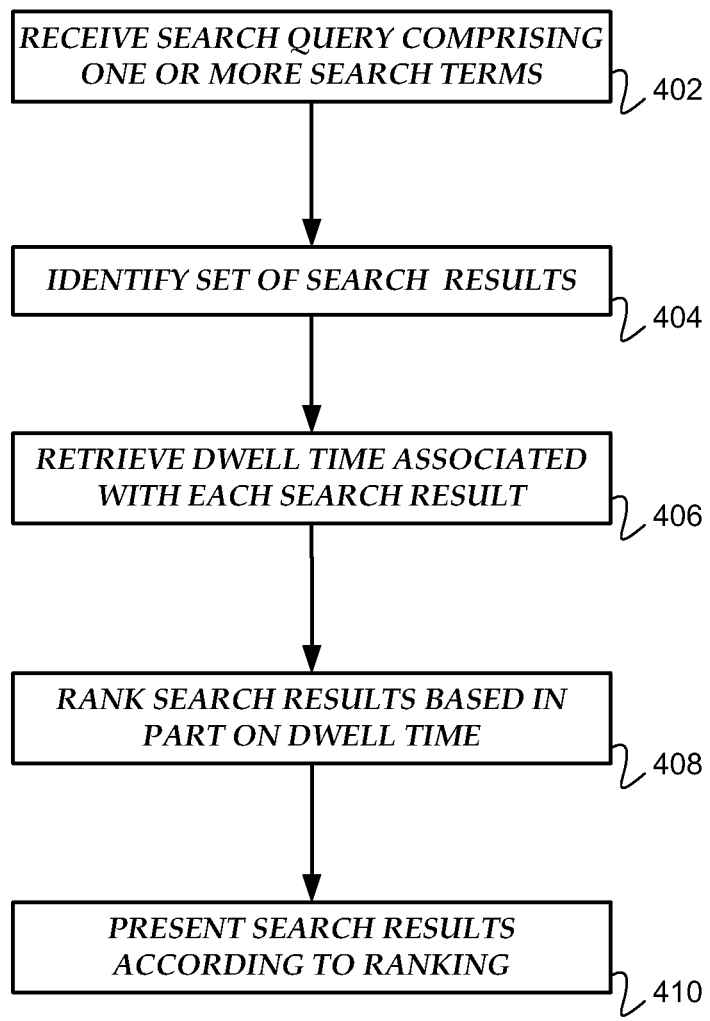
FIG. 4 illustrates an example of a method, according to an embodiment of the invention, for processing a search query and presenting item listings in a search results page.

FIG. 4 illustrates an example of a technique 400, according to an embodiment of the invention, for processing a search query and presenting item listings in a search results page. The technique 400 may be performed, at least in part, by the dwell time engine 300.

In an operation 402, a search query is received from a user via a user interface. The user interface may comprise one or more fields for receiving one or more search terms from the user. The search query may be received by the search module 302.

In an operation 404, a set of search results is identified by, for example, the search module 302. The search results comprise a plurality of listings stored, for example, in the listing database 304. Each of the listings may be associated with data (e.g., business rule data or seller quality data) that may be used to rank the listings relative to one another.

In an operation 406, the dwell time associated with each respective search result is retrieved by, for example, the dwell time module 306. The dwell time module 306 may retrieve the associated dwell time from the dwell time database 308 or from other data stored in association with the listing. The dwell time associated with the listing is calculated from a history of elapsed time buyers have spent viewing the respective listing.

In an operation 408, the search results are ranked based at least in part on the dwell time associated with each listing by, for example, the ranking module 310. The ranked results are then presented to a buyer in an operation 410.

Figure 5:
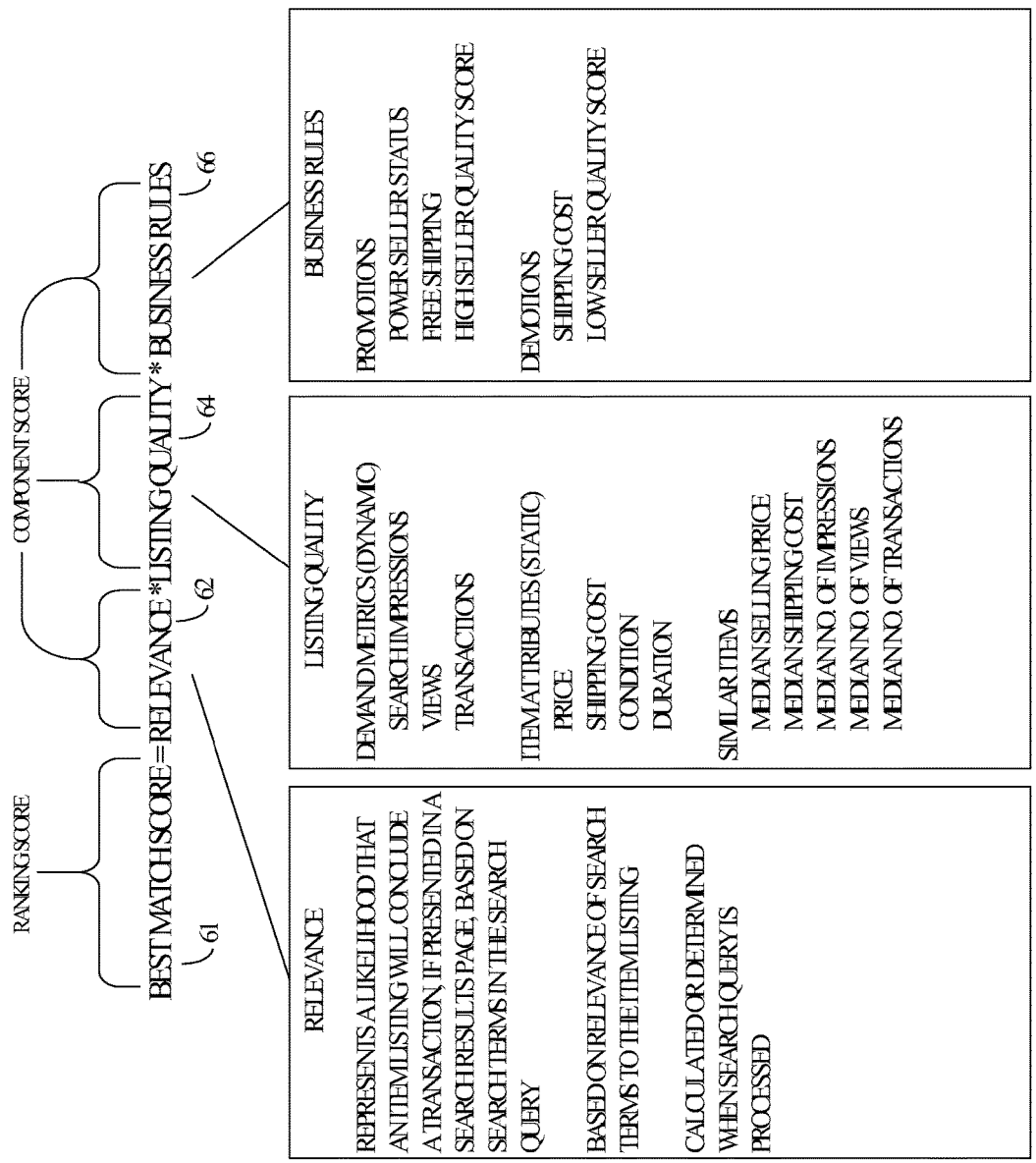
FIG. 5 illustrates an example of a formula or equation, which is used to derive a ranking score, in some embodiments of the invention.

FIG. 5 illustrates an example of a formula or equation, which is used to derive a ranking score, in some embodiments of the invention.

As briefly noted above, in some embodiments, the ranking score (e.g., the Best Match Score) assigned to an individual item listing is based in part on a listing quality score representing a measure of the overall quality of an item listing, including the dwell time associated with the listing. For instance, the quality of an item listing may be viewed as the probability that an item being offered for sale via the item listing will be purchased if the item listing is presented in a search results page. In general, with all else equal, those item listings that satisfy the user's search query and have the highest listing quality scores are presented in the most prominent positions of the search results page. As described in detail below, many factors or sub-components may go into determining the listing quality score for an item listing. Additionally, item listings may be assigned to different groups or "buckets" based on certain characteristics of the item listings, such that a different algorithm is used to determine the listing quality score used in deriving an item listing's ranking score, based on the assigned group or bucket. Similarly, item listings assigned to certain groups may be intermingled (e.g., rearranged or re-ranked) to ensure that a certain ratio or mix of item listings, based on their assigned category, are presented in a search results page.

As illustrated in FIG. 5, the listing quality score 82 may be calculated with a formula taking the general form of the equation with reference number 80. In this equation 80, "LQ" stands for Listing Quality, and the symbol "*", represents a multiplication operation. As shown in the equation 80 presented in FIG. 5, the score 82 in some embodiments is calculated as a weighted sum of two parts—a predicted listing quality score 84, based in part on an analysis of item attributes and seller attributes known at listing time—and, an observed listing quality score 86, based on an analysis of an item listing's actual performance over time. The item attributes and seller attributes used for deriving the predicted listing quality score 84 are generally static in nature and, with a few exceptions, are not expected to change from the time the item listing is first generated. The observed listing quality score 86 is generally based on historical data obtained over the life of the item listing, and as such, is considered to be based on dynamic data.

In some instances, the listing quality score may be calculated using one or more indicator variables to describe ranges of continuous values. Using the indicator variables, the likelihood of transaction (TL) and dwell time (t) is calculated from t as:

$$TL = a_1 * R_1 + a_2 * R_2 + \ldots + a_n * R_n$$

Where $a_i$ are constants computed from modeling previous data and $r_n$ are binary indicators of a range in a continuous variable t:

$$R_1 = 1 \text{ if } 0 < t <= t_1 \text{ or } 0 \text{ otherwise.}$$

$$R_2 = 1 \text{ if } t_1 < t <= t_2 \text{ or } 0 \text{ otherwise.}$$

$$R_3 = 1 \text{ if } t_2 < t <= t_3 \text{ or } 0 \text{ otherwise.}$$

$$\ldots$$

$$R_n = 1 \text{ if } t_{(n-1)} < t <= t_n \text{ or } 0 \text{ otherwise.}$$

Note that, in this example embodiment, for a value of t, only one $R_i$ value will 1 and the others 0.

Because a new item listing will not yet have been presented in a search results page, a new item listing will not have any associated historical data by which its performance can be measured. Accordingly, for new item listings, the listing quality score 82 is based primarily upon the predicted listing quality score 84, and is essentially a prediction of how the item listing will perform, based on an analysis of the item attributes, and in some cases seller attributes, of the item listing. In particular, the analysis used in determining the predicted listing quality score 84 involves comparing the item attributes of the item listing with item attributes of other similar item listings for which historical performance data is available. For example, if the price of an item is higher or lower than some measure of central tendency (e.g., median, mean or mode) for the prices of similar items, then this information can be used to predict how the new item listing will perform.

In addition to the price of an item, a variety of other item attributes may be considered in deriving the predicted listing quality score 84 for the overall listing quality score 82, including: the condition of the item, the shipping method and cost, the duration or length of time the item listing has been active, a seller's prior conversion rate for all items or items in a particular category, as well as a seller's rating (e.g., based on feedback provided by buyers). In general, a high price will result in a lower listing quality score 82—particularly a high price relative to the mean, median or mode price of similar item listings. Similarly, the higher the cost of shipping relative to the cost of shipping for similar item listings, the lower the listing quality score will be. With respect to the condition of the item, the better the condition stated by the seller, typically the better the listing quality score will be. Of course, a great number of other item or seller attributes might be considered when deriving the predicted listing quality score 84.

Various methods may be used to identify those item listings deemed similar to the item listing to which the listing quality score is being assigned. For instance, a comparison of the titles may be made, such that item listings using one or more of the same key words in their titles may be deemed similar. Additionally, two item listings may be deemed similar only when the item listings have similar titles and they are assigned to the same category, or are listed on the same website. Additional constraints may also be used. For instance, an item listing may be deemed similar to the item listing to which the listing quality score is being assigned if the prices of the item listings are within a certain percentage of one another. For example, this prevents an unreasonable comparison of a Mercedes Benz toy car priced at $3.00, with a Mercedes Benz classic car priced at $300,000. In some embodiments, only a certain percentage of the most similar items are used when determining the predicted listing quality score. For instance, when determining the median price of similar item listings, the median price of the top 10% of most similar item listings may be determined for comparison purposes.

In addition, when deriving the predicted listing quality score 84 for an item listing, the actual performance of item listings determined to be similar may be considered. Accordingly, the similar item listings that are of interest are the item listings that have resulted in transactions, or have some historical data available to assess their performance. For instance, if an analysis of historical data indicates that the conversion rate for a certain product is 90% when the product is priced at or below a particular price, then a prediction can be made that the likelihood that an item listing for that product with a price at or below the particular price is 90%. This may result in a high listing quality score. The number of search impressions, number of views, number of watch lists, associated dwell time and/or number of transactions concluded for item listings determined to be similar may provide an indication of how a new item listing will perform. In this case, a search impression is defined as the presentation of an item listing in a search results page. Accordingly, every time an item listing appears in a search results page, a search impression counter for the item listing is increased. A view occurs when an item listing presented in a search results page is selected by, and presented to, a user. A watch list is a mechanism for monitoring an item listing. For example, a potential buyer may add an item listing to a watch list so that the potential buyer receives notifications about certain events, such as, the conclusion of a transaction via an auction, and so forth. The number of unique users who add an item listing to a watch list can be used as a measure of the interest (demand) in an item listing. A transaction is the sale of an item. In some embodiments, when a user purchases an item in quantity, a single transaction will be counted. For instance, if a user buys five items via a single multi-quantity item listing, the sale of the five items is viewed as a single transaction for the purpose of determining a demand metric used in calculating the predicted score component of a listing quality score.

In some embodiments, a measure of central tendency (e.g., a median, mean or mode) is calculated for a particular item attribute, or demand metric, for a certain sized subset of similar item listings. For instance, for a certain sized subset of the most similar item listings, the median selling price, median shipping cost, median number of search impressions, median dwell time and so forth, are calculated. Then, the item attributes of the item listing being assigned the predicted listing quality score are compared to these median values. If, for example, the median price at which transactions were concluded for a set of similar item listings is greater than the price of an item listing being assigned a listing quality score, then the lower price of the item listing, compared to the median price of similar item listings, should be reflected in the listing quality score as a positive (e.g., a higher score). Similarly, if the item listing being assigned a predicted listing quality score has a shipping cost that is higher than the median shipping cost for the set of similar item listings under consideration, this high shipping cost—relative to the median shipping cost of similar items—is reflected in the predicted listing quality score as a negative (e.g., lower score).

In some embodiments, the predicted listing quality score 84 may be used as the overall listing quality score 82. However, as shown in the equation 80 of FIG. 5, some embodiments utilize a weighted sum of the predicted listing quality score 84, and the observed listing quality score 86. The demand metrics that may be used to derive the observed listing quality score 86 are transactions (sales), views, search impressions, and watch lists. In some embodiments, one of these demand metrics may be used, while in other embodiments, some combination of the metrics may be used to form the overall observed listing quality score 82. In some embodiments, the exact combination or formula used to derive the observed listing quality score 86 may differ by category. For instance, the observed listing quality score 86 for item listings in the "Automobiles" category may be based on some combination of search impressions and watch lists, while the observed listing quality score 82 for item listings in the "Jewelry" category may be based on some combination of watch lists and views.

One of the issues that exists with conventional methods for assessing the quality of an item listing is that exposure (e.g., search impressions) leads to transactions (sales), which leads to more exposure. Consequently, when a listing quality score depends in part on a demand metric, such as transactions (sales), those item listings that have performed well in the past tend to be deemed as high quality, and are therefore positioned in the search results page in the most prominent positions (e.g., at the top of the first page). Of course, being placed in a prominent position on the search results page will naturally result in additional transactions (sales), leading one to believe the item listing is high in quality. This of course makes it difficult for new item listings, with no historical data available for assessing quality, to break-in to the high quality tier of item listings and receive placement in the most prominent positions in the search results page.

Some embodiments of the invention address this issue in at least two ways. First, as illustrated in FIG. 5, the listing quality score 82 in some embodiments is calculated as a weighted sum of two parts—a predicted listing quality score 84, based on an analysis of item attributes known at listing time—and, an observed listing quality score 86, based on an analysis of an item listing's actual performance over time. The weighting factor 88 is applied to the two components such that the listing quality score 82 for new item listings, which have no attainable performance history, is based primarily on the predicted score 84. For instance, in some embodiments, when an item listing is first listed, the value of the weighting factor, "WEIGHT", is set to zero. Accordingly, with "WEIGHT" equal to zero, the listing quality score 82 is equivalent to the predicted listing quality score 84. However, over time, as actual data are obtained and the performance of the item listing can be assessed, the weighting factor is changed, shifting the emphasis to the observed listing quality score 86. For instance, with a value for "WEIGHT" of one half (0.5), the weighting factor for the predicted listing quality score and observed listing quality score is equal- and equivalent to one half.

While one method of calculating a ranking score is provided in FIG. 5, it is understood that dwell time associated with a listing may be used in other ranking methods as well, including machine learning techniques, rules-based techniques, or the like.

Figure 6:
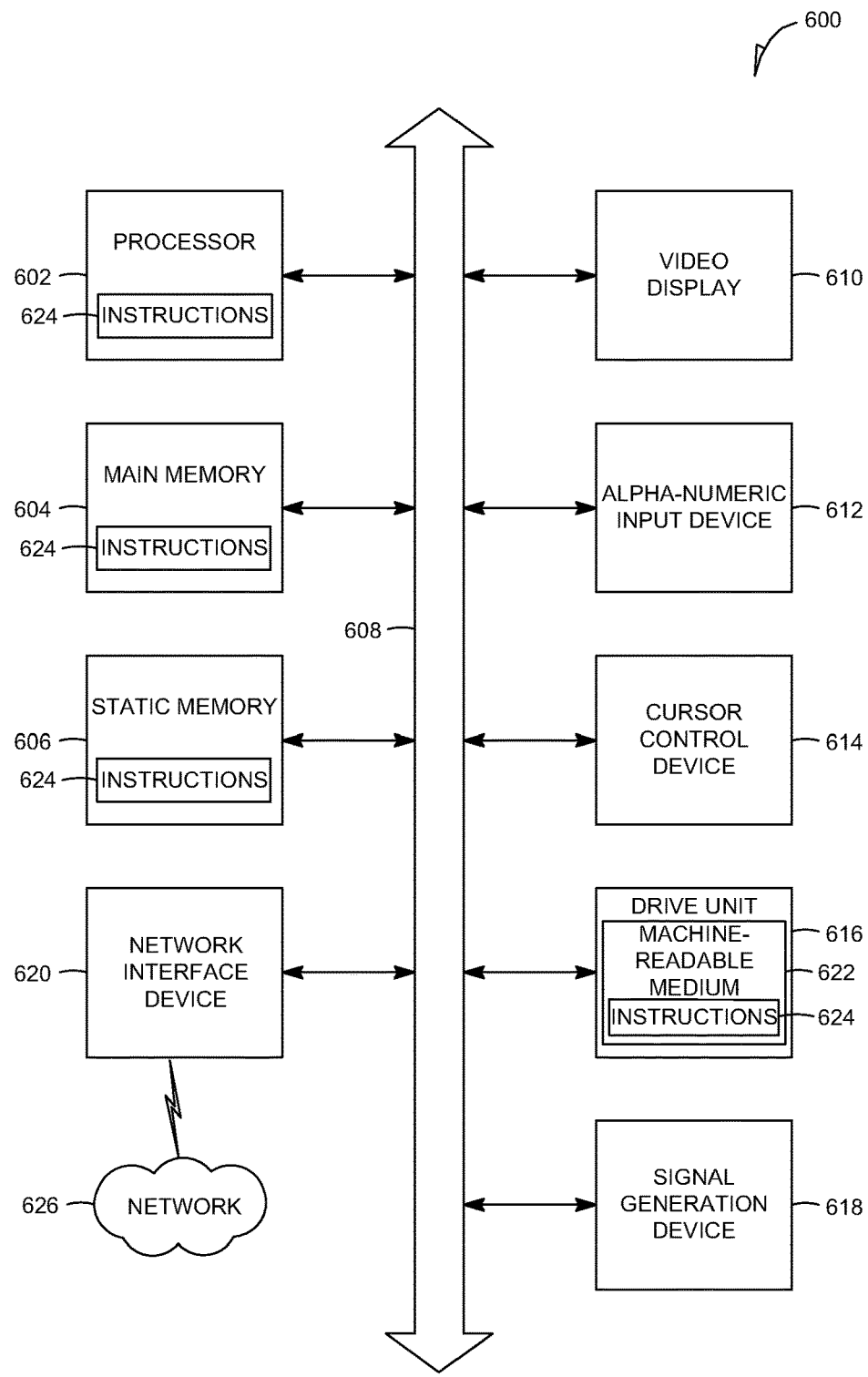
FIG. 6 is a block diagram of a machine within which a set of instructions, for causing the machine to perform any one or more of the methodologies discussed herein, may be executed.

FIG. 6 shows a diagrammatic representation of machine in the example form of a computer system 600 within which a set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a server computer, a client computer, a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 600 includes a processor 602 (e.g., a central processing unit (CPU) a graphics processing unit (GPU) or both), a main memory 604 and a static memory 606, which communicate with each other via a bus 608. The computer system 600 may further include a video display unit 610 (e.g., a liquid crystal display (LCD) or a cathode ray tube (CRT)). The computer system 600 also includes an alphanumeric input device 612 (e.g., a keyboard), a cursor control device 614 (e.g., a mouse), a disk drive unit 616, a signal generation device 618 (e.g., a speaker) and a network interface device 620.

The disk drive unit 616 includes a machine-readable medium 622 on which is stored one or more sets of instructions (e.g., software 624) embodying any one or more of the methodologies or functions described herein. The software 624 may also reside, completely or at least partially, within the main memory 604 and/or within the processor 602 during execution thereof by the computer system 600, the main memory 604 and the processor 602 also constituting machine-readable media.

The software 624 may further be transmitted or received over a network 626 via the network interface device 620.

While the machine-readable medium 622 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present invention. The term "machine-readable medium" shall accordingly be taken to include, but not be limited to, solid-state memories, optical and magnetic media, and carrier wave signals.

Thus, a method and system to rank results based on dwell time have been described. Although the present invention has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense.

The Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A system comprising:
   a search module configured to identify a plurality of listings stored in a listing database as search results;
   a dwell time module configured to, using one or more processors, determine a respective dwell time associated with each of the plurality of listings, the dwell time for each listing based on an elapsed amount of time one or more users view a page describing the listing, and the dwell time associated with a likelihood of a transaction occurring with respect to each listing; and a ranking module configured to rank the identified plurality of listings based at least in part on the respective dwell time associated with each of the plurality of listings.

2. The system of claim 1, further comprising a presentation module to present the identified plurality of listings to user in a search results page, the identified plurality of listings ordered in the search results page according to the ranking of the listings.

3. The system of claim 1, wherein the search module is to identify the plurality of the listings based on a keyword.

4. The system of claim 1, wherein the search module is to identify the plurality of the listings based on a selection of a category.

5. The system of claim 1, wherein the dwell time module is to determine a dwell time associated with a particular listing based on the amount of time one or more users have viewed a seller information page.

6. The system of claim 1, wherein the dwell time is determined for a listing when a number of views of the page associated with the listing meets or exceeds a predetermined threshold.

7. The system of claim 1, wherein the dwell time is modified when a viewer of the page has previously completed a transaction with a seller that provided the listing.

8. The system of claim 1, wherein the dwell time is modified when a number of transactions completed by a viewer of the page meets or exceeds a predetermined threshold.

9. The system of claim 1, wherein the dwell time is modified based on a history of dwell times of a viewer at other pages.

10. The system of claim 1, wherein the dwell time is modified when the dwell time exceeds a predetermined threshold.

11. The system of claim 1, wherein the ranking of the listings is based in part on a listing quality score.

12. The system of claim 1, wherein the rankings of the listings is based in part on one or more business rules.

13. The system of claim 1, wherein the rankings of the listings ranks a first listing associated with a longer dwell time higher than a second listing associated with a shorter dwell time.

14. The system of claim 1, wherein the dwell time is a median of the elapsed amount of time each of the one or more users view the view item page.

15. The system of claim 1, wherein the dwell time is a mean of the elapsed amount of time each of the one or more users view the view item page.

16. The system of claim 1, wherein each of the respective listings of the identified plurality of listings each describe an item for sale.

17. A method comprising:
identifying a plurality of listings stored in a listing database as search results;
determining, using a processor, a respective dwell time associated with each of the plurality of listings, the dwell time based on an elapsed amount of time one or more users view a page describing the listing, and the dwell time associated with a likelihood of a transaction occurring with respect to the listing; and
ranking the listings composing the identified plurality of listings based at least in part on the respective dwell time associated with each of the plurality of listings.

18. A non-transitory machine-readable medium having instruction embodied thereon, the instruction executable by a processor for performing a method comprising:
identifying a plurality of listings stored in a listing database as search results;
determining a respective dwell time associated with each of the plurality of listings, the dwell time based on an elapsed amount of time one or more users view a page describing the listing, and the dwell time associated with a likelihood of a transaction occurring with respect to the listing; and
ranking the listings composing the identified plurality of listings based at least in part on the respective dwell time associated with each of the plurality of listings.

19. The system of claim 1, wherein the likelihood of the transaction occurring includes the likelihood of a viewer purchasing an item associated with the listing, the likelihood of the viewer bidding in an auction associated with the listing, the likelihood of the viewer adding the listing to a watch list, or the likelihood of the viewer sharing the listing with a user.

* * * * *